US011290254B2

(12) United States Patent
Dash et al.

(10) Patent No.: US 11,290,254 B2
(45) Date of Patent: Mar. 29, 2022

(54) CENTRALIZED TRANSACTION TRACKING USING MULTI-BLOCKCHAIN TECHNOLOGY

(71) Applicant: EMC IP Holding Company LLC, Hopkinton, MA (US)

(72) Inventors: Sudeshna Dash, Hyderabad (IN); Anitha Bhavani Chimata, Tirupathi (IN); Muvvala Venkata Lakshmi Mounica, Telangana (IN); Lakshmi Kottali, Telangana (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 210 days.

(21) Appl. No.: 16/668,790

(22) Filed: Oct. 30, 2019

(65) Prior Publication Data

US 2021/0135843 A1 May 6, 2021

(51) Int. Cl.
*H04L 29/06* (2006.01)
*H04L 9/06* (2006.01)
*H04L 9/32* (2006.01)

(52) U.S. Cl.
CPC .......... *H04L 9/0637* (2013.01); *H04L 9/3242* (2013.01); *H04L 2209/38* (2013.01)

(58) Field of Classification Search
CPC . H04L 9/0637; H04L 9/3242; H04L 2209/38; H04L 9/0861; H04L 9/3236
See application file for complete search history.

(56) References Cited

U.S. PATENT DOCUMENTS

| | | | |
|---|---|---|---|
| 2019/0102163 A1* | 4/2019 | Witherspoon | G07C 13/00 |
| 2019/0386817 A1* | 12/2019 | Carson | G06F 21/64 |
| 2020/0005255 A1* | 1/2020 | Wu | G06F 16/258 |
| 2020/0382277 A1* | 12/2020 | Kong | G06F 21/64 |
| 2020/0394651 A1* | 12/2020 | Kreder, III | G06Q 20/22 |
| 2021/0218560 A1* | 7/2021 | Nix | H04L 9/3066 |

OTHER PUBLICATIONS

Shekhtman et al., "Securing Log Files Through Blockchain Technology," In Proceedings of the 11th ACM International Systems and Storage Conference, pp. 131-131. ACM, 2018.

* cited by examiner

*Primary Examiner* — Mahfuzur Rahman
(74) *Attorney, Agent, or Firm* — Ryan, Mason & Lewis, LLP

(57) ABSTRACT

Methods, apparatus, and processor-readable storage media for centralized transaction tracking using multi-blockchain technology are provided herein. An example computer-implemented method includes obtaining one or more messages communicated between two or more applications that are part of a message-based transaction architecture; and for each given one of said messages: identifying a key identifier value of said given message; determining a message type of said given message from among a set of message types; selecting, based on a predetermined mapping between the set of message types and a set of hash functions, the hash function that is mapped to the message type of said given message; and storing the given message in one of a plurality of blockchains based at least in part on the selected hash function and the determined key identifier value.

20 Claims, 7 Drawing Sheets

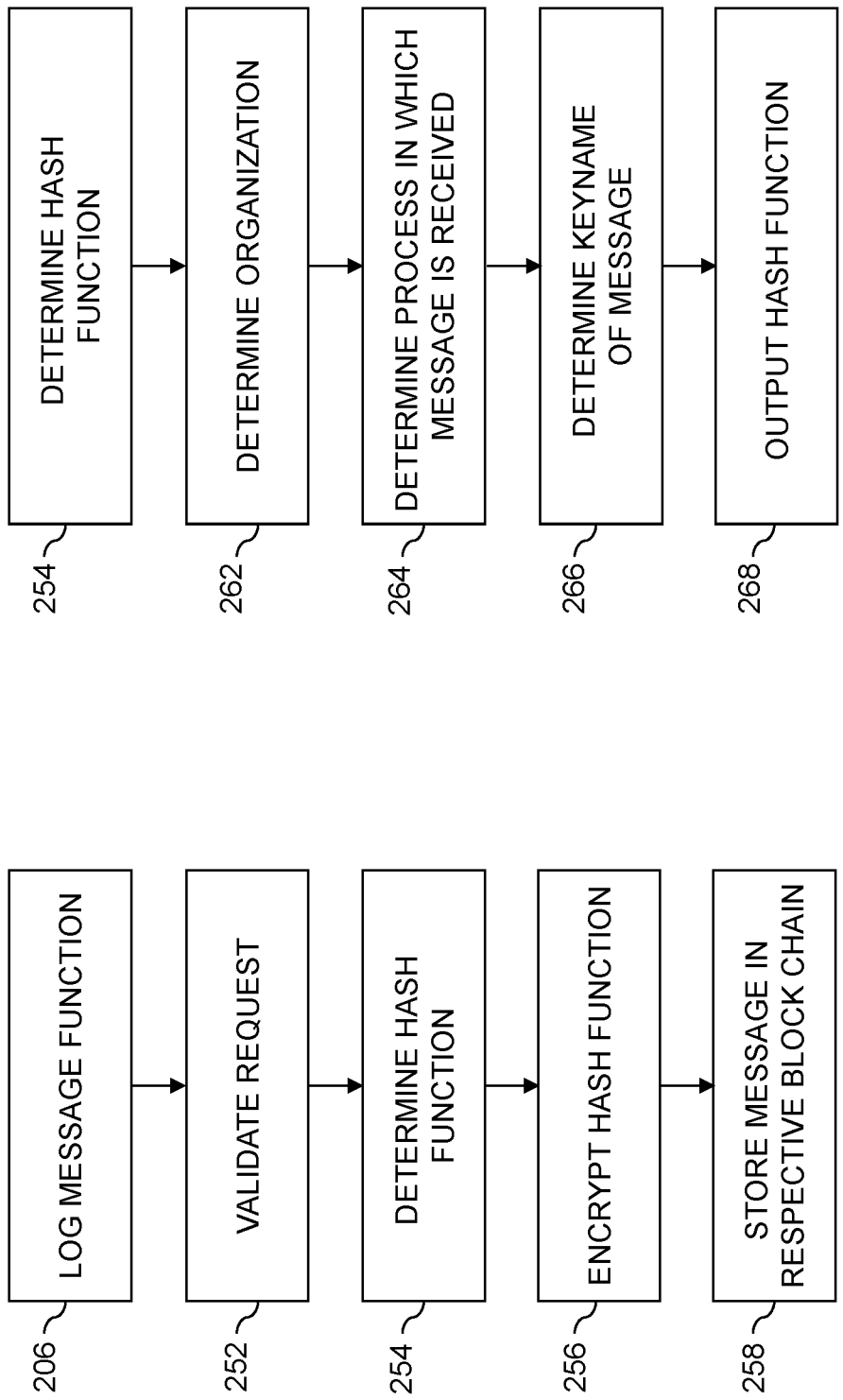

CENTRALIZED TRANSACTION TRACKING USING MULTI-BLOCKCHAIN TECHNOLOGY

FIELD

The field relates generally to information processing systems, and more particularly to techniques for centralized transaction tracking in such systems.

BACKGROUND

In a service-based model, multiple applications and/or systems communicate between themselves using messages, which are transported using various methods. Each application is aware of only the messages that it sends or receives. In order to troubleshoot a problem in this type of distributed transaction tracking framework, the messages from every application must be requested individually. In some situations, a message can become lost if an application fails to log it, which can be problematic for retrigger actions or for troubleshooting problems. Also, a message may be stored by multiple applications, thereby leading to redundancies in the system.

SUMMARY

Illustrative embodiments of the invention provide techniques for centralized transaction tracking using multi-blockchain technology. An exemplary computer-implemented method includes obtaining one or more messages communicated between two or more applications that are part of a message-based transaction architecture. The method also includes, for each given one of said messages: identifying a key identifier value of said given message; determining a message type of said given message from among a set of message types; selecting, based on a predetermined mapping between the set of message types and a set of hash functions, the hash function that is mapped to the message type of said given message; and storing the given message in one of a plurality of blockchains based at least in part on the selected hash function and the determined key identifier value.

Illustrative embodiments can provide significant advantages relative to conventional transaction techniques. For example, challenges associated with mining transactions across multiple applications are overcome through implementation of a centralized platform that retains transactions in a reliable, efficient, and traceable way using multi-blockchain technology.

These and other illustrative embodiments described herein include, without limitation, methods, apparatus, systems, and computer program products comprising processor-readable storage media.

BRIEF DESCRIPTION OF THE DRAWINGS

FIGS. 2A-2C are process flow diagrams in accordance with exemplary embodiments of the invention.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
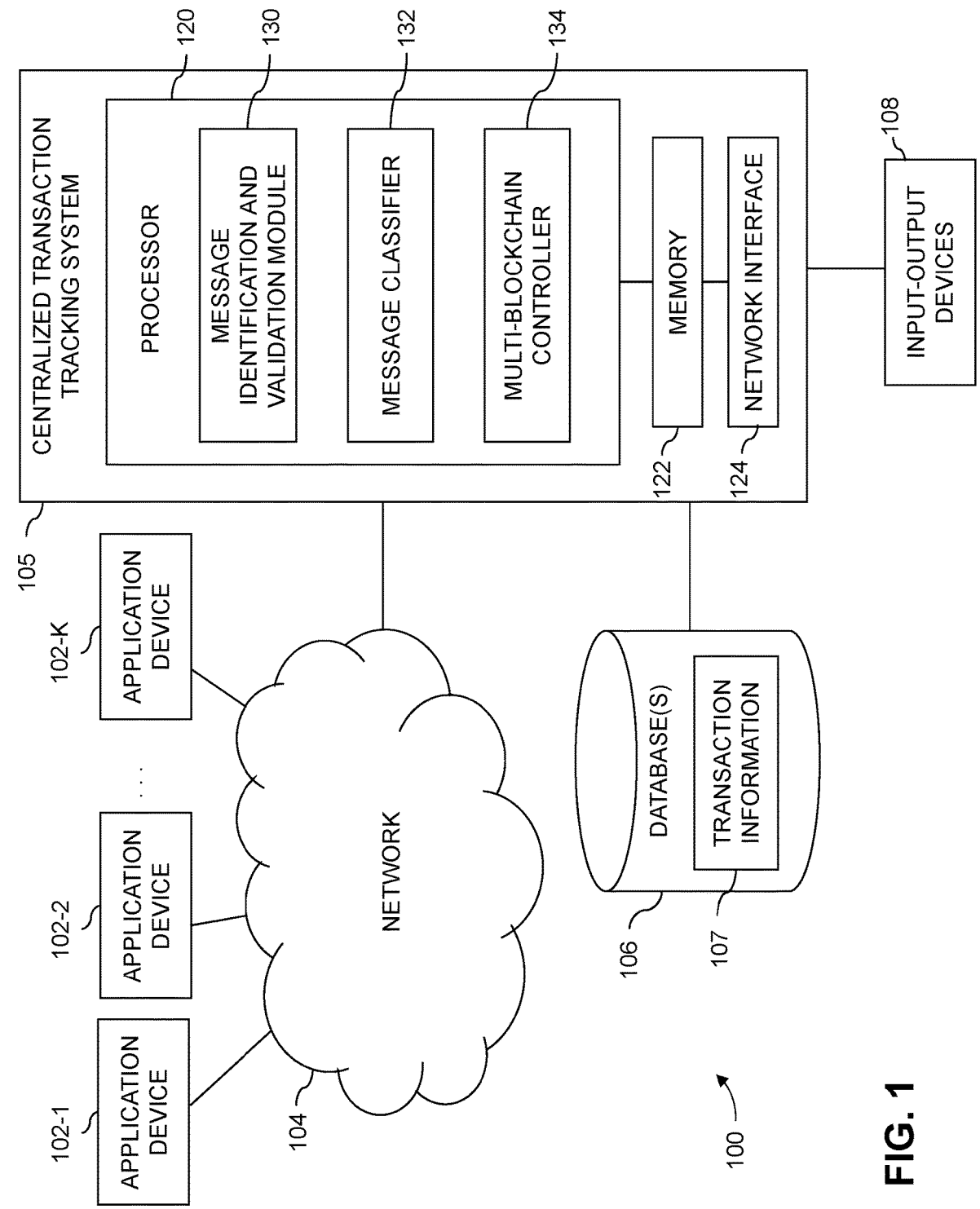
FIG. 1 shows an information processing system configured for centralized transaction tracking using multi-blockchain technology in an illustrative embodiment of the invention.

FIG. 1 shows a computer network (also referred to herein as an information processing system) 100 configured in accordance with an illustrative embodiment of the invention. The computer network 100 comprises a plurality of application devices 102-1, 102-2, . . . 102-K, collectively referred to herein as application devices 102. The application devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is centralized transaction tracking system 105.

The application devices 102 may comprise, for example, servers, mobile telephones, laptop computers, tablet computers, desktop computers or other types of computing devices. Such devices are examples of what are more generally referred to herein as "processing devices." Some of these processing devices are also generally referred to herein as "computers." According to at least one example embodiment, the application devices 102 provide one or more services as part of a service-oriented architecture.

The application devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" as used herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The centralized transaction tracking system 105 can have an associated database 106 configured to store data 107 pertaining to transaction information, which comprise, for example, messages or transactions between one or more of the application devices 102.

The database 106 in the present embodiment is implemented using one or more storage systems associated with the centralized transaction tracking system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the centralized transaction tracking system 105 are input-output devices 108, which illustratively comprise keyboards, displays or other types of input-output devices in any combination. Such input-output devices can be used, for example, to support one or more user interfaces to the centralized transaction tracking system 105, as well as to support communication between the centralized transaction tracking system 105, the application devices 102, and other related systems and devices not explicitly shown.

The centralized transaction tracking system 105 and each application device 102 in the FIG. 1 embodiment is assumed to be implemented using at least one processing device. Each such processing device generally comprises at least one processor and an associated memory, and implements one or more functional modules for controlling certain features of the centralized transaction tracking system 105.

More particularly, the centralized transaction tracking system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the centralized transaction tracking system 105 to communicate over the network 104 with the application devices 102, and illustratively comprises one or more transceivers.

The processor 120 further comprises a message identification and validation module 130, a message classifier 132, and a multi-blockchain controller 134.

It is to be appreciated that this particular arrangement of modules 130, 132, and 134 illustrated in the processor 120 of the FIG. 1 embodiment is presented by way of example only, and alternative arrangements can be used in other embodiments. For example, the functionality associated with the modules 130, 132, and 134 in other embodiments can be combined into a single module, or separated across a larger number of modules. As another example, multiple distinct processors can be used to implement different ones of the modules 130, 132, and 134 or portions thereof.

At least portions of the message identification and validation module 130, message classifier 132, and the multi-blockchain controller 134 may be implemented at least in part in the form of software that is stored in memory 122 and executed by processor 120.

It is to be understood that the particular set of elements shown in FIG. 1 for centralized transaction tracking using multi-blockchain technology involving application devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing the message identification and validation module 130, message classifier 132, and the multi-blockchain controller 134 of the centralized transaction tracking system 105 in computer network 100 will be described in more detail with reference to the flow diagrams of FIGS. 2A-2C and FIG. 4.

Unless the context indicates otherwise, the term 'application' is used herein to refer to an application and/or service. Multiple applications can operate within, for example, a given company or organization. Applications communicate between themselves using messages in the form of, for example, xml, j son, etc. As non-limiting examples, messages may be transported between different applications using message queues (MQs), service-oriented architectures (SOAs), distributed streaming platforms, databases, and Representational State Transfer (REST) services. Each message that travels between two of the applications is transformed with the addition of new elements or removing some other element to, for example, facilitate business. Each message is associated with a particular keyname. By way of example, when an order is placed in a system, a message from one or more front-end applications may be in the form of a production order message. This message is then converted into a sales order message. Each sales order is associated with a lifecycle. Thus, the sales order message may have a route plan added in a first message exchange, and part details added in a second message exchange, etc.

When a failure occurs in this type of setting (e.g., with one of the applications), typically, the first step is to check the messages with respect to the corresponding keyname. However, the messages corresponding to the keyname are frequently distributed over (or, e.g., stored at) different applications. As such, a user must individually request the messages from each application owner. Moreover, in situations a message may become lost (e.g., cannot be retrieved) when it is not logged by a respective application. In other situations, the same message may be logged in more than one place (e.g., by multiple applications), thereby causing redundancies (i.e., inefficiencies) in the overall system. In other words, existing techniques leave the responsibility of storing/logging of messages to each individual application.

Accordingly, exemplary embodiments described herein provide techniques for classifying every message exchanged between a set of applications with a given cryptographic hash function. The details of each message are then stored in a multi-blockchain model. Storing each transaction (i.e., message exchange) using a multi-blockchain model allows messages to be free from any manipulation. Additionally, ambiguity that is often present with existing techniques is avoided as one or more of the techniques described herein ensure that messages are properly classified by an object-based model.

Figure 2A:
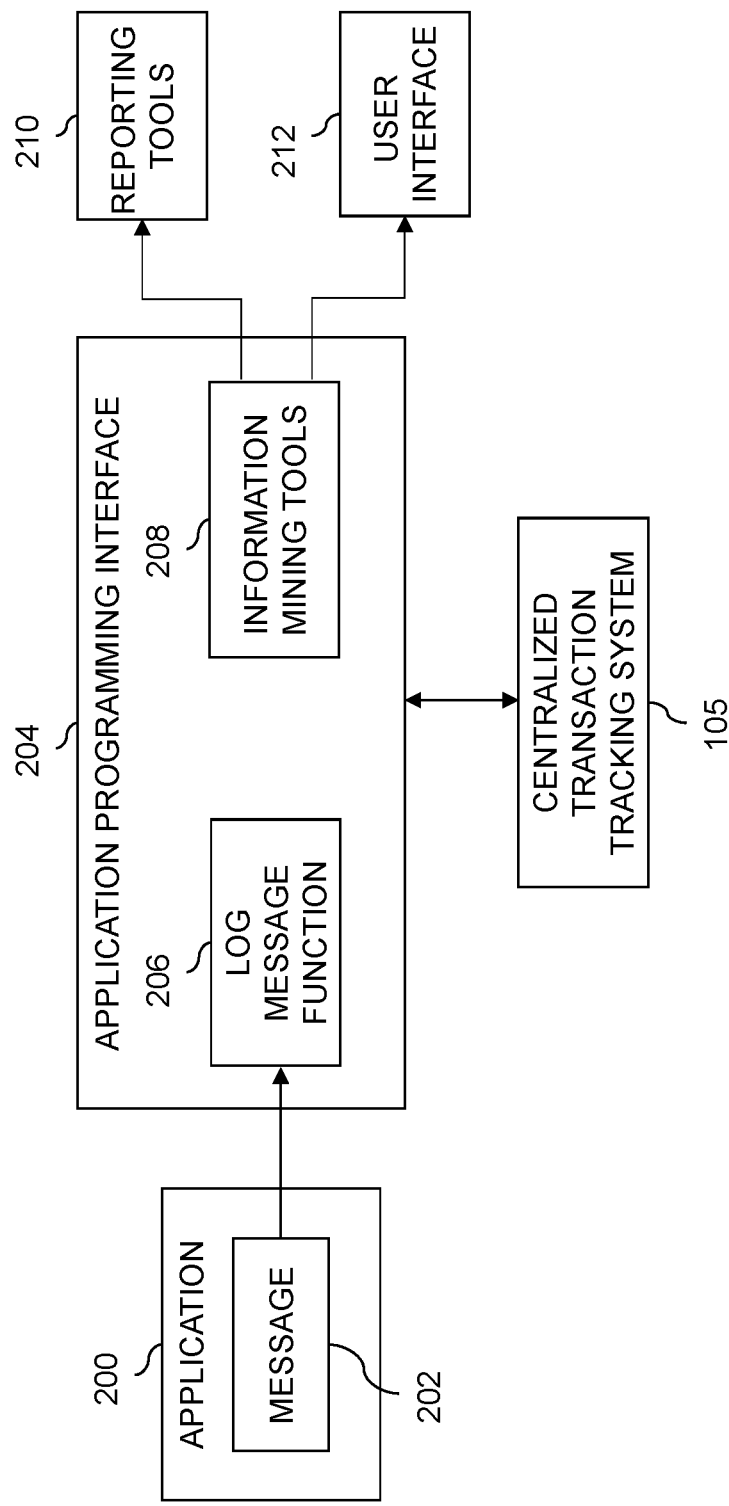

Referring now to FIG. 2A, this figure shows a process flow diagram in accordance with exemplary embodiments of the invention. In the example depicted in FIG. 2A, an application 200 interacts with the centralized transaction tracking system 105 using an application programming interface (API) 204 to log a message 202. The API 204 may be a web API, for example, and the application 200 may correspond to one of the application devices 102 in FIG. 1, for example. The application 200 uses a log message function 206 defined by the API 204 to log the message 202 in a multi-blockchain model associated with the centralized transaction tracking system 105, as discussed in further detail below with reference to FIGS. 2B and 2C. The API 204 in the FIG. 2 embodiment also includes one or more information mining tools 208 that provide access to messages that are logged by the centralized transaction tracking system 105. For example, the information mining tools 208 may, in response to a user request, output information via one or more reporting tools 210 and/or to a graphical user interface 212. The user may be a support team user or development team user associated with one or more of the application devices 102 and/or the centralized transaction tracking system 105, for example.

FIG. 2B shows a flow diagram of an exemplary process corresponding to log message function 206 of FIG. 2A. In this example, log message function 206 receives a request to log the message 202. The request is validated by, for example, obtaining metadata information related to the message 202 and validating the message using a smart contract as indicated by block 252. The metadata information is then used to determine a predefined hash function (or, for example, a predefined key structure) as indicated by block 254. After the hash function is identified, an equivalent cryptographic hash function is determined as indicated by block 256. For example, determining the equivalent cryptographic hash function may include encrypting the hash function into SHA256. The message 202 is then stored with its own key identifier value into a block of a particular blockchain of the multi-blockchain model, wherein the particular blockchain corresponds to the encrypted hash value as indicated by block 258.

FIG. 2C is a flow diagram for an exemplary process for determining the hash function for message 202. Determining the hash function includes identifying an organization corresponding to the message 202 as indicated by block 262. For example, the organization may be an organization associated with the application 200, for example. Next, one or more processes of the organization are identified in which the message is received as indicated by block 264, and a keyname associated with the message is determined as indicated by block 266. Each keyname is associated with a type of message or type of object, and each of these types is mapped to a particular hash function. The hash function that is mapped to the determined keyname is output so that the equivalent cryptographic hash function can be determined as indicated by block 268. It is noted that one or more of the organization name, the one or more processes of the organization, and the keyname may be determined based on content of the message 202 and/or the corresponding metadata information.

Figure 3:
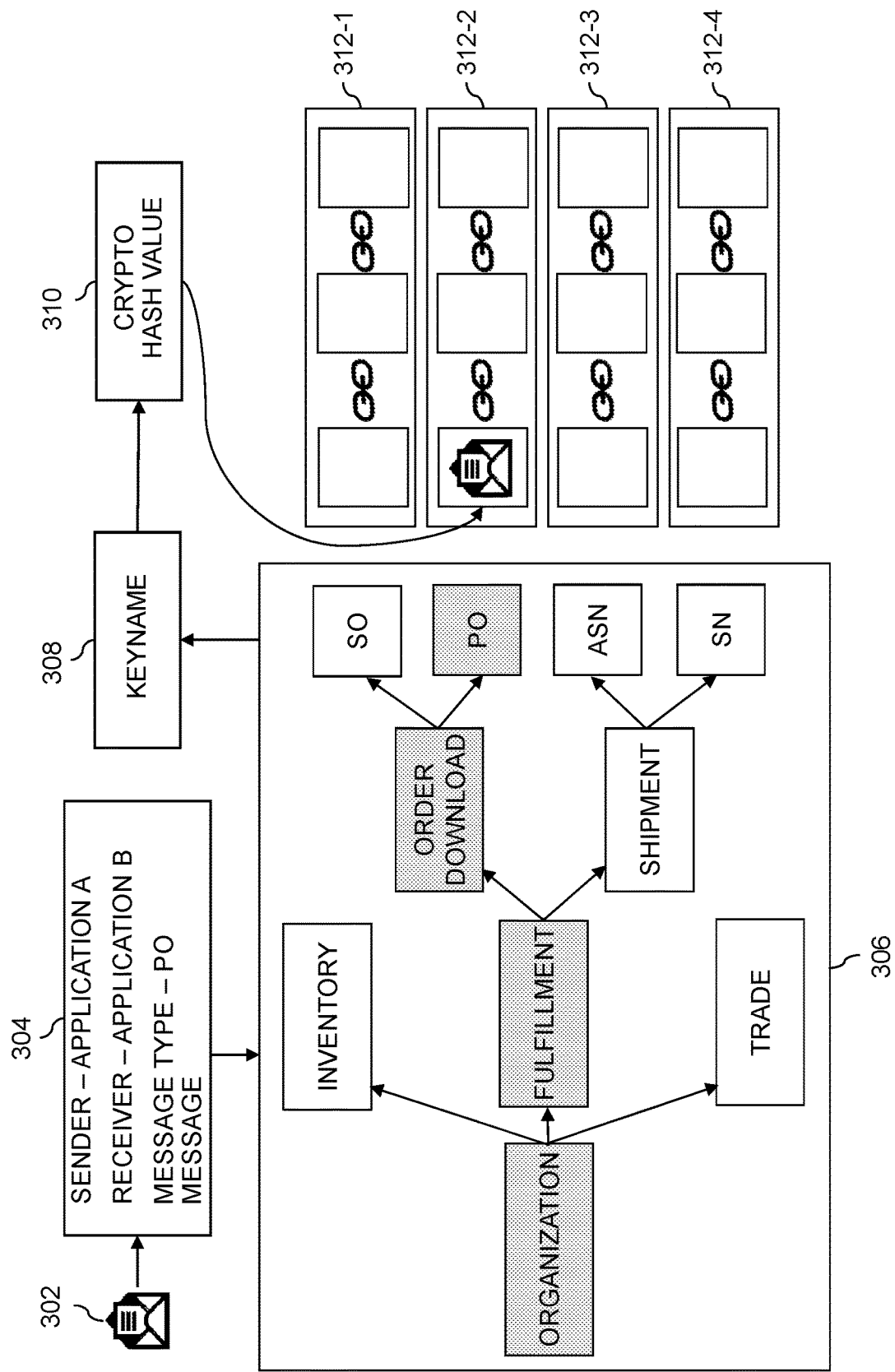
FIG. 3 shows an example of a message being inserted into a block of multi-blockchain model in accordance with exemplary embodiments of the invention.

Referring also to FIG. 3, this figure shows an example of a message being inserted into a block of a multi-blockchain model in accordance with exemplary embodiments of the invention. In FIG. 3, a message 302 is sent by Application A to Application B. Metadata information 304 associated with the message 302 is gathered that identifies, for example, the sender, the receiver, and a message type. In this example, the message type is a purchase order (PO) message. Based on this information, a keyname is found as indicated by the shaded boxes shown in block 306. In the present example, an organization, a fulfillment process, and an order download process are identified. The order download process includes the object type 'PO' which corresponds to the message type indicated in the metadata information 304. The identified keyname 308 for this message type is Fulfillment_OrderDownload_PO.

It is noted that the organization in this example also includes other object types including a sales order (SO) object type, an advanced shipping notice (ASN) object type, and a shipment number (SN) object type. Each of these object types has a corresponding blockchain in a multi-blockchain model. In particular, blockchains 312-1 to 312-4 correspond to object types, SO, PO, ASN, and SN, respectively.

After the keyname 308 is identified for the message 302, a cryptographic hash value 310 is computed that indicates the specific blockchain where PO objects are stored. In this example, the message 302 is pushed into the blockchain model at 312-2. In this way, all messages related to PO objects enter the blockchain 312-2. For example, if message 302 has a key identifier value equal to '123' then it is stored in the blockchain 312-2 with other messages that are also related to the PO object (e.g., messages with key identifiers 345, 456, etc.). As such, the classification is done with respect to object types such as SO, PO, ASN or SN. It should be understood that this classification is merely an example, and the classification may be performed in a number of different ways. For example, the classification process may be dependent on the needs of a business or organization, and may be defined during an initial configuration, for example.

Now assume another message to be logged is in the form of <SalesOrderNumber>123</SalesOrderNumber><ShipTo>aaa</ShipTo>, then it can be determined that the message is associated with the SO message type and that the same key identifier 123 is being used that was used for message 302. However, this message enters its corresponding blockchain, i.e., 312-1, thus avoiding any ambiguity with other messages having the same key identifier. In this manner, the multi-blockchain model tracks the state of any object such that all messages are stored without ambiguity.

Figure 4:
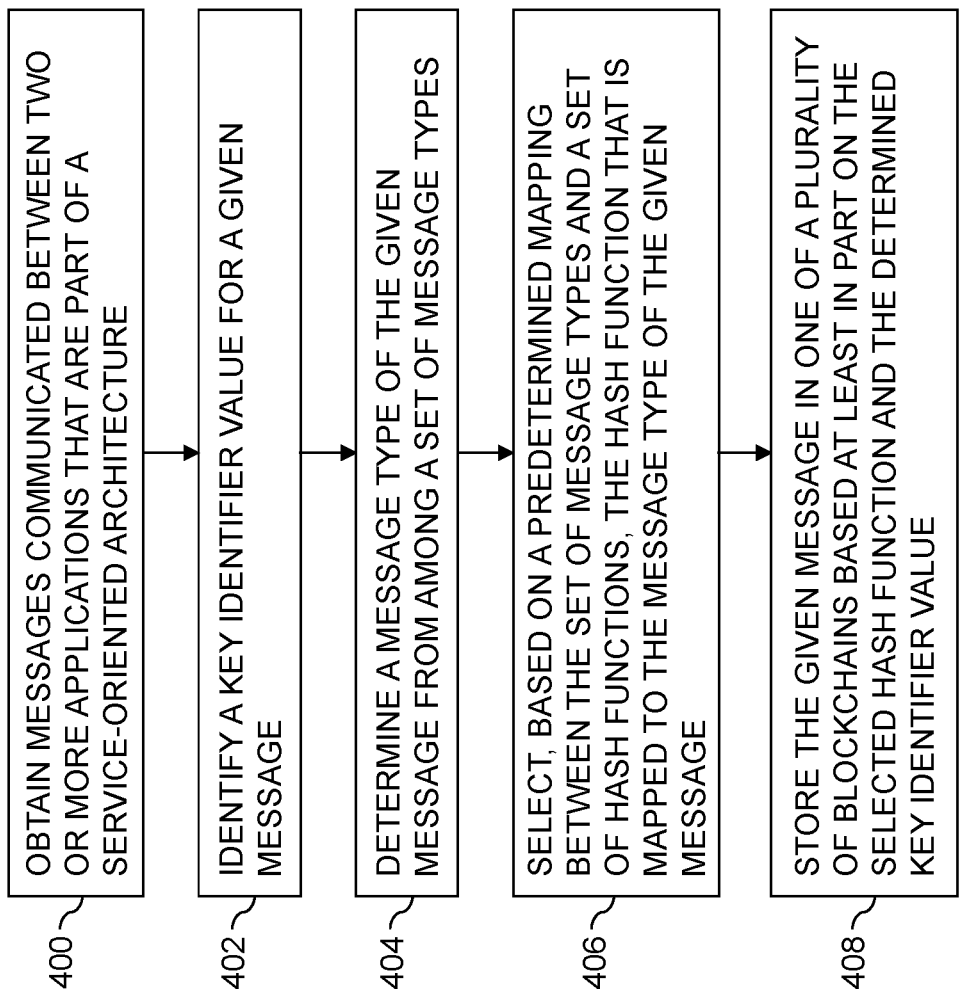
FIG. 4 is a flow diagram of a process for centralized transaction tracking using multi-blockchain technology in an illustrative embodiment.

FIG. 4 is a flow diagram of a process for centralized transaction tracking using multi-blockchain technology in an illustrative embodiment. It is to be understood that this particular process is only an example, and additional or alternative processes can be carried out in other embodiments.

In this embodiment, the process includes steps 400 through 408. These steps are assumed to be performed by the processor 120 utilizing its modules 130, 132, and 134.

Step 400 includes obtaining one or more messages communicated between two or more applications using message-based transactions. Step 402 includes identifying a key identifier value for a given one of the messages. Step 404 includes determining a message type of said given message from among a set of message types. Step 406 includes selecting, based on a predetermined mapping between the set of message types and a set of hash functions, the hash function that is mapped to the message type of said given message. Step 408 includes storing the given message in one of a plurality of blockchains based at least in part on the selected hash function and the determined key identifier value.

In the process depicted in FIG. 4, each of the messages stored in a given blockchain may have the same message type. Also, at least two of the messages may have the same key identifier value and different message types such that the at least two messages are stored in different blockchains. Step 408 may include encrypting the selected hash function of said given message to obtain a cryptographic key; and storing the given message into the blockchain using said cryptographic key. The process may further include obtaining metadata information related to each of said one or more messages, wherein the metadata comprises at least one of: a sender application of said given message; a receiver application of said given message; and one or more processes corresponding to at least one of said sender application and said receiver application. Also, the process may include validating each of said one or more messages using a smart contract based at least in part on said metadata information. The process may include obtaining a request to retrieve messages associated with a particular key identifier value; and retrieving messages stored in the plurality of blockchains corresponding to the particular key identifier value. The message types may include object types, and each of the blockchains may track state information for one or more objects of a particular one of the object types.

Accordingly, the particular processing operations and other functionality described in conjunction with the flow diagram of FIG. 4 are presented by way of illustrative example only, and should not be construed as limiting the scope of the invention in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to provide centralized transaction tracking across application and/or services in, for example, a service-oriented architecture. These and other embodiments can effectively: provide data transparency (as any user can view transaction depending on, for example, a user's role or security rules); make transactions non-revocable once stored in the multi-blockchain model; avoid ambiguity between different objects having the same identifier values; provide simplified troubleshooting; provide additional security when storing messages (as data is stored in a cryptographic format); eliminate lost data due to manual intervention; eliminate downtime; reduce redundancies; and provide users with centralized transaction tracking.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a content addressable storage system in illustrative embodiments. These and other cloud-based systems in illustrative embodiments can include object stores.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
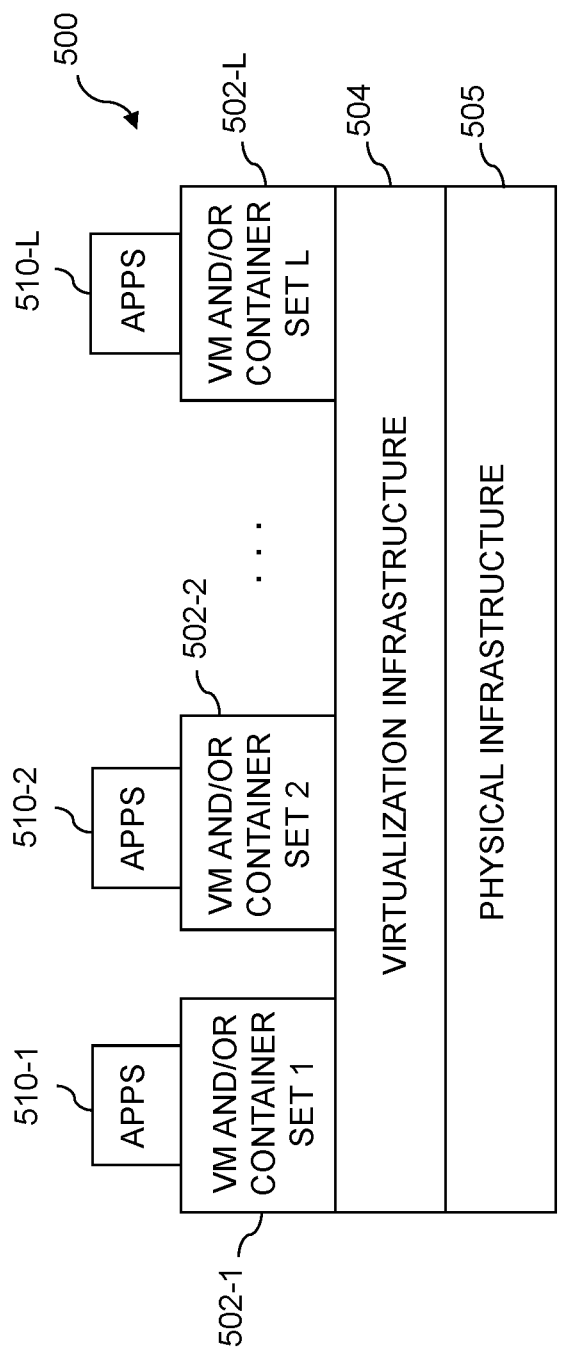
FIGS. 5 and 6 show examples of processing platforms that may be utilized to implement at least a portion of an information processing system in illustrative embodiments.
Figure 6:
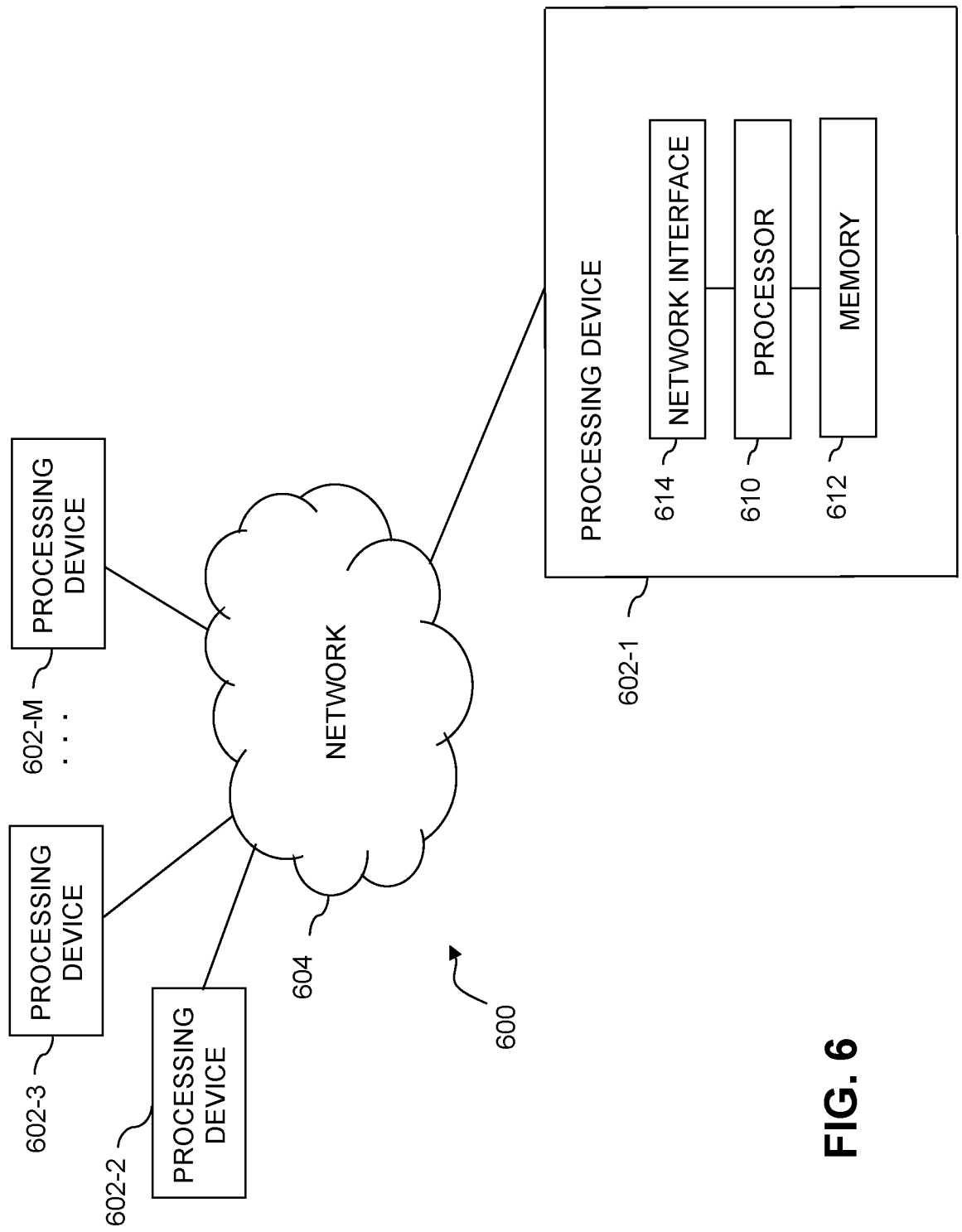

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-M, which communicate with one another over a network 604.

The network 604 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an ASIC, an FPGA or other type of processing circuitry, as well as portions or combinations of such circuitry elements.

The memory 612 may comprise RAM, ROM or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include software-defined storage products, all-flash and hybrid flash storage arrays, cloud storage products, object-based storage products, scale-out all-flash storage arrays, and scale-out NAS clusters. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide secure authentication processes involving multiple user devices. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
obtaining one or more messages communicated between two or more applications that are part of a message-based transaction architecture; and
for each given one of said messages:
identifying a key identifier value of said given message;
determining an object type corresponding to said given message from among a set of object types;
selecting, based on a predetermined mapping between the set of object types and a set of hash functions, the hash function that is mapped to the determined object type corresponding to said given message;
selecting, based at least in part on the selected hash function, one of a plurality of blockchains that corresponds to the object type of said given message; and
storing the given message in the selected blockchain based at least in part on the selected hash function and the determined key identifier value;
wherein the method is performed by at least one processing device comprising a processor coupled to a memory.

2. The computer-implemented method of claim 1, wherein each of the messages stored in a given blockchain corresponds to the same object type.

3. The computer-implemented method of claim 1, wherein at least two of said messages have the same key identifier value and correspond to different object types such that the at least two messages are stored in different blockchains.

4. The computer-implemented method of claim 1, wherein said storing comprises:
encrypting the selected hash function to obtain a cryptographic key; and
storing the given message into the selected blockchain using said cryptographic key.

5. The computer-implemented method of claim 1, further comprising obtaining metadata information related to each of said one or more messages, wherein the metadata comprises at least one of:
a sender application of said given message;
a receiver application of said given message; and
one or more processes corresponding to at least one of said sender application and said receiver application.

6. The computer-implemented method of claim 5, further comprising:
validating each of said one or more messages using a smart contract based at least in part on said metadata information.

7. The computer-implemented method of claim 1, further comprising:
obtaining a request to retrieve messages associated with a particular key identifier value; and
retrieving messages stored in the plurality of blockchains corresponding to the particular key identifier value.

8. The computer-implemented method of claim 1, wherein each of the plurality of blockchains tracks state information for one or more objects of a particular one of the object types.

9. The computer-implemented method of claim 1, wherein said message-based transaction architecture comprises a service-oriented architecture.

10. A non-transitory processor-readable storage medium having stored therein program code of one or more software programs, wherein the program code when executed by at least one processing device causes the at least one processing device:
to obtain one or more messages communicated between two or more applications that are part of a message-based transaction architecture; and
for each given one of said messages:
to identify a key identifier value of said given message;
to determine an object type corresponding to said given message from among a set of object types;
to select, based on a predetermined mapping between the set of object types and a set of hash functions, the hash function that is mapped to the determined object type corresponding to said given message;
to select, based at least in part on the selected hash function, one of a plurality of blockchains that corresponds to the object type of said given message; and
to store the given message in the selected blockchain based at least in part on the selected hash function and the determined key identifier value.

11. The non-transitory processor-readable storage medium of claim 10, wherein each of the messages stored in a given blockchain corresponds to the same object type.

12. The non-transitory processor-readable storage medium of claim 10, wherein at least two of said messages have the same key identifier value and correspond to different object types such that the at least two messages are stored in different blockchains.

13. The non-transitory processor-readable storage medium of claim 10, wherein said storing comprises:
encrypting the selected hash function to obtain a cryptographic key; and
storing the given message into the selected blockchain using said cryptographic key.

14. The non-transitory processor-readable storage medium of claim 10, wherein the at least one processing device is further caused to obtain metadata information related to each of said one or more messages, wherein the metadata comprises at least one of:
a sender application of said given message;
a receiver application of said given message; and
one or more processes corresponding to at least one of said sender application and said receiver application.

15. The non-transitory processor-readable storage medium of claim 14, the at least one processing device is further caused to validate each of said one or more messages using a smart contract based at least in part on said metadata information.

16. The non-transitory processor-readable storage medium of claim 10, the at least one processing device is further caused:
to obtain a request to retrieve messages associated with a particular key identifier value; and
to retrieve messages stored in the plurality of blockchains corresponding to the particular key identifier value.

17. The non-transitory processor-readable storage medium of claim 10, wherein said two or more applications are part of a service-oriented architecture.

18. An apparatus comprising:
at least one processing device comprising a processor coupled to a memory;
the at least one processing device being configured:

to obtain one or more messages communicated between two or more applications that are part of a message-based transaction architecture; and for each given one of said messages:
   to identify a key identifier value of said given message;
   to determine an object type corresponding to said given message from among a set of object types;
   to select, based on a predetermined mapping between the set of object types and a set of hash functions, the hash function that is mapped to the determined object type corresponding to said given message;
   to select, based at least in part on the selected hash function, one of a plurality of blockchains that corresponds to the object type of said given message; and
   to store the given message in the selected blockchain based at least in part on the selected hash function and the determined key identifier value.

19. The apparatus of claim 18, wherein each of the messages stored in a given blockchain corresponds to the same object type.

20. The apparatus of claim 18, wherein at least two of said messages have the same key identifier value and correspond to different object types such that the at least two messages are stored in different blockchains.

\* \* \* \* \*